United States Patent
Ohtake

(10) Patent No.: US 9,210,059 B2
(45) Date of Patent: Dec. 8, 2015

(54) CLUSTER SYSTEM

(71) Applicant: NEC Corporation, Minato-ku, Tokyo (JP)

(72) Inventor: Takamasa Ohtake, Tokyo (JP)

(73) Assignee: NEC CORPORATION, Tokyo (JP)

( * ) Notice: Subject to any disclaimer, the term of this patent is extended or adjusted under 35 U.S.C. 154(b) by 297 days.

(21) Appl. No.: 13/748,189

(22) Filed: Jan. 23, 2013

(65) Prior Publication Data

US 2013/0238787 A1 Sep. 12, 2013

(30) Foreign Application Priority Data

Mar. 9, 2012 (JP) ................... 2012-052640

(51) Int. Cl.
*H04L 12/26* (2006.01)
*G06F 11/20* (2006.01)

(52) U.S. Cl.
CPC ........ *H04L 43/0876* (2013.01); *G06F 11/2033* (2013.01)

(58) Field of Classification Search
CPC .. H04L 43/0876; H04L 12/26; G06F 11/2033
USPC ............ 709/200, 224, 249, 251, 25; 395/182, 395/200
See application file for complete search history.

(56) References Cited

U.S. PATENT DOCUMENTS

| | | | | |
|---|---|---|---|---|
| 5,805,785 A | * | 9/1998 | Dias et al. ................. | 714/4.4 |
| 6,212,573 B1 | * | 4/2001 | Lim et al. .................. | 719/315 |
| 6,581,166 B1 | * | 6/2003 | Hirst et al. ................ | 714/4.4 |
| 7,627,694 B2 | * | 12/2009 | Sreenivasan et al. ....... | 709/251 |
| 8,516,089 B2 | * | 8/2013 | Johnsen et al. ............ | 709/221 |
| 2001/0052084 A1 | * | 12/2001 | Huang et al. .............. | 714/4 |
| 2006/0050629 A1 | | 3/2006 | Saiga | |
| 2008/0201470 A1 | * | 8/2008 | Sayama .................... | 709/224 |
| 2010/0185894 A1 | | 7/2010 | Herta | |
| 2012/0144006 A1 | * | 6/2012 | Wakamatsu et al. ........ | 709/220 |
| 2013/0173778 A1 | * | 7/2013 | Hsy et al. ................. | 709/224 |

FOREIGN PATENT DOCUMENTS

EP 1 117 041 A2 7/2001
JP 200679161 A 3/2006

OTHER PUBLICATIONS

The Extended European Search Report for EP 13152199.9 dated on May 23, 2013.

* cited by examiner

*Primary Examiner* — Ebrahim Golabbakhsh

(57) ABSTRACT

A cluster system of the present invention is a cluster system including a plurality of node devices. Each of the node devices is connected with the other node devices by a first network and a second network, and includes: a first node managing unit configured to operate on an operating system embedded in an own device and detect operation statuses of the other node devices via the first network; a second node managing unit configured to operate without being affected by the operating system and detect operation statuses of the other node devices via the second network; and a node status judging unit configured to judge whether each of the node devices is in a down state according to a preset standard, based on results of the detection of the other node devices by the first node managing unit and the second node managing unit.

9 Claims, 12 Drawing Sheets

CLUSTER SYSTEM

INCORPORATION BY REFERENCE

This application is based upon and claims the benefit of priority from Japanese patent application No. 2012-052640, filed on Mar. 9, 2012, the disclosure of which is incorporated herein in its entirety by reference.

TECHNICAL FIELD

The present invention relates to a cluster system, specifically, a cluster system configured by a plurality of nodes and managing whether the nodes are alive.

BACKGROUND ART

In recent years, the advent of cloud computing leads to an issue how to guarantee the quality of a service provided to a user by a provider, namely, how to keep SLA (Service Level Agreement). Therefore, a cluster system configured by a plurality of nodes as shown in Patent Document 1 has a redundant configuration to, even when a node providing a service comes into a down state, take over the service to another node, thereby guaranteeing the quality of the service. On the other hand, it is also an issue for clusterware installed in such a cluster system how quickly and accurately grasp the states (operation statues, or whether a fault has occurred or not) of the nodes in order to realize higher SLA.

Alive monitoring of nodes in a cluster system is performed in a manner that the nodes check the operation states each other by using, as a communication path, something that enables the nodes to exchange information, such as a LAN (Local Area Network), serial ports or a shared disk. In a case that it is impossible to perform communication with a certain node for a given time or more, the certain node is judged to be in the down state.

[Patent Document 1] Japanese Unexamined Patent Application Publication No. JP-A 2006-79161

However, in the abovementioned method, a LAN, serial ports, a shared disk and so on are all controlled as management resources of an OS (Operating System), and therefore, are affected by the operation state of the OS, other than a physical fault of a communication path. For example, in a case that the OS of a specific node comes into a high load condition and cannot perform communication with other nodes for a given time or more, the specific node is considered to be in the down state by the other nodes though the node is not down actually.

Further, in a case that a node goes down due to a hardware fault or the like, it takes a specific time or more before the node is judged to be in the down state, and therefore, it is impossible to instantly execute system switching. For example, when power interruption is caused by a CPU (Central Processing Unit) fault and one node comes into a down state, it takes a specific time or more before another node judges the one node to be in the down state.

Thus, there is a problem for a cluster system that it is impossible to accurately and rapidly grasp the statuses of nodes, and therefore, it is impossible to rapidly switch the nodes and the reliability of the system decreases.

SUMMARY

Accordingly, an object of the present invention is to solve the abovementioned problem, "the reliability of the system decreases."

A cluster system of an exemplary embodiment of the present invention is a cluster system including a plurality of node devices.

Each of the node devices is connected with the other node devices by a first network and a second network, and includes:

a first node managing unit configured to operate on an operating system embedded in an own device and detect operation statuses of the other node devices via the first network;

a second node managing unit configured to operate without being affected by the operating system and detect operation statuses of the other node devices via the second network; and a node status judging unit configured to judge whether each of the node devices is in a down state according to a preset standard, based on results of the detection of the other node devices by the first node managing unit and the second node managing unit.

Further, a program of another exemplary embodiment of the present invention is a program for causing each of a plurality of node devices configuring a cluster system including the plurality of node devices, to realize:

a first node managing unit configured to operate on an operating system embedded in an own device and detect operation statuses of the other node devices via a first network connected to the other node devices;

a second node managing unit configured to operate without being affected by the operating system and detect operation statuses of the other node devices via a second network connected to the other node device; and a node status judging unit configured to judge whether each of the node devices is in a down state according to a preset standard, based on results of the detection of the other node devices by the first node managing unit and the second node managing unit.

Further, a node management method of another exemplary embodiment of the present invention includes, in a cluster system including a plurality of node devices:

by a first node managing unit configured to operate on an operating system embedded in each of the node devices, detecting operation statuses of the other node devices via a first network connected with the other node devices;

by a second node managing unit configured to operate without being affected by the operating system embedded in the node device, detecting operation statuses of the other node devices via a second network connected with the other node device; and judging whether each of the node devices is in a down state according to a preset standard, based on results of the detection of the other node devices by the first node managing unit and the second node managing unit.

With the configurations as described above, the present invention can increase the reliability of a cluster system.

EXEMPLARY EMBODIMENT

A cluster system (also referred to as a "cluster" hereinafter) according to the present invention includes a plurality of node devices (also referred to as "nodes" hereinafter). The respective nodes execute alive monitoring each other. The cluster system has a function to, in a case that one node comes into a down state, execute a system switching process of causing another node to restart a service having been executed by the one node. Below, the cluster system according to the present invention will be described.

First Exemplary Embodiment

Figure 1:
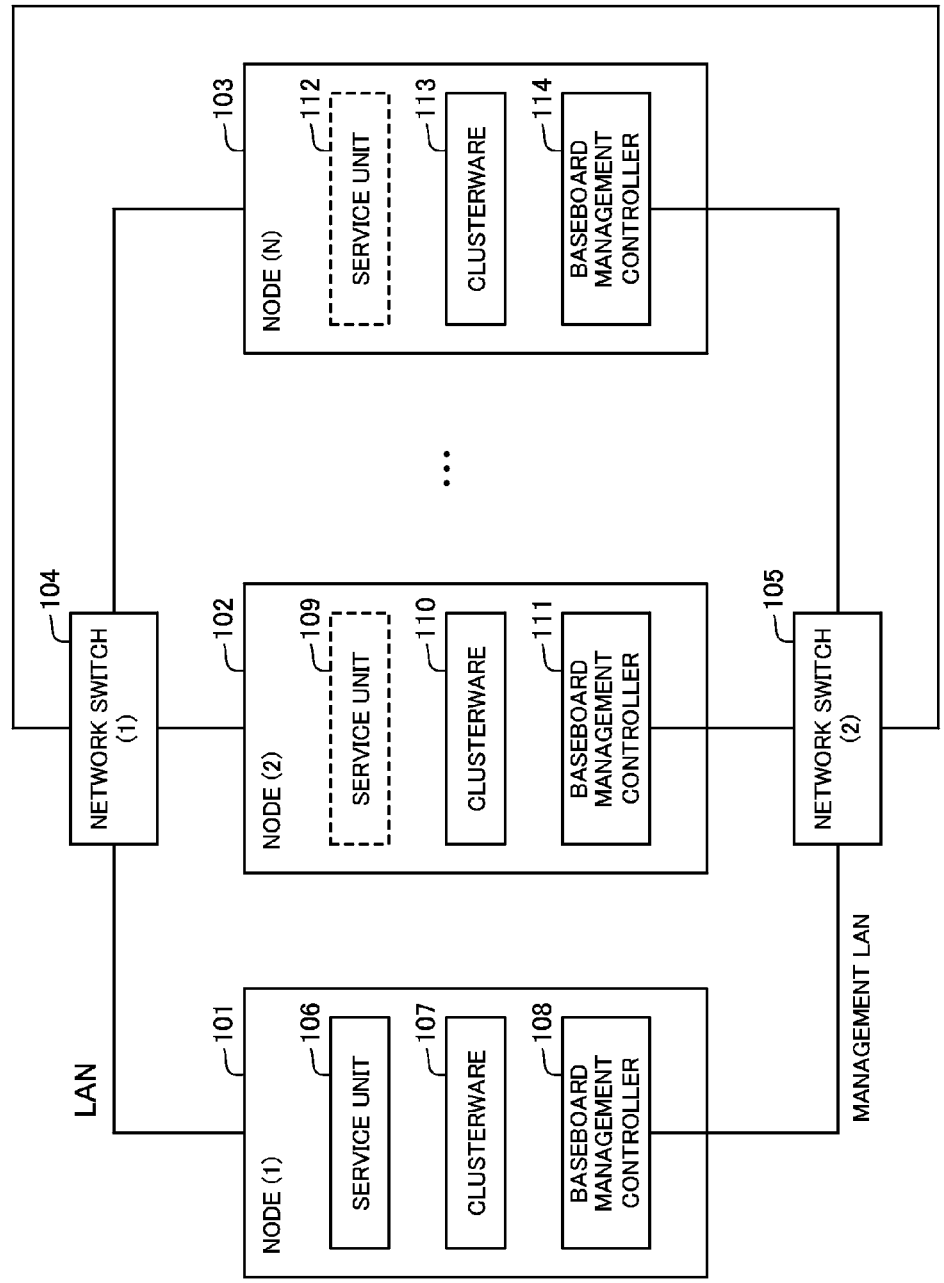
FIG. 1 is a block diagram showing the configuration of a cluster system in a first exemplary embodiment of the present invention.
Figure 2:
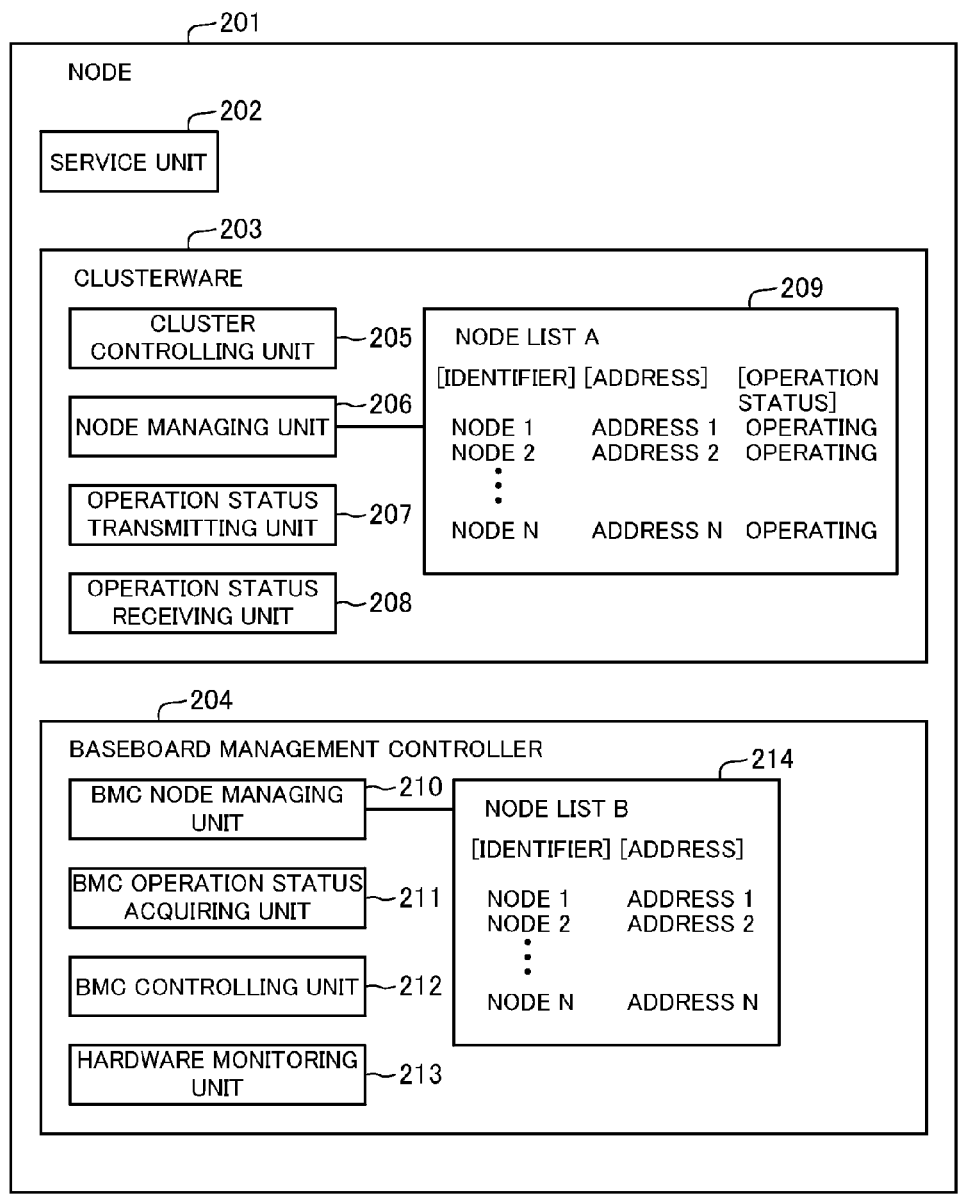
FIG. 2 is a block diagram showing the configuration of a node configuring the cluster system disclosed in FIG. 1.

A first exemplary embodiment of the present invention will be described with reference to FIGS. 1 to 11. FIGS. 1 and 2 are diagrams for describing the configuration of the cluster system. FIGS. 3 to 11 are views for describing the operation of the cluster system.

As shown in FIG. 1, the cluster system according to the present invention includes a plurality of node devices as shown with a node (1) 101, a node (2) 102, and a node (N) 103. The node devices 101 . . . are each configured by an information processing device like a server computer. However, the node devices 101 . . . may be each configured by an information processing device virtually structured as explained in a second exemplary embodiment described later. The number of the node devices 101 . . . configuring the cluster system according to the present invention is not limited to the number thereof in FIG. 1.

The node devices 101 . . . described above, in each of which an operating system (also referred to as "OS" hereinafter) is embedded, has service units 106 . . . for performing a predetermined service process provided to users and clusterwares 107 . . . for controlling the operation of the cluster system, respectively. The service units 106 . . . and the clusterwares 107 . . . are structured by embedding programs into arithmetic devices installed in the node devices 101 . . . , respectively. Hereinafter, the node devices 101 . . . will be shown and described with reference numeral 201 in FIG. 2.

Among the service units described above, the service unit 106 included in the node device 101, which is an active system among the node devices 101 . . . configuring the cluster system, operates and provides a service process to a user. On the other hand, the service units 109 and 112 included in the other node devices 102 and 103, which are standby systems, are on standby (refer to dotted lines in FIG. 1). Then, the clusterware 107 controls a process to start or stop the service units 106 . . . . Therefore, in a case that the service unit 106 is incapable of continuing to operate because of, for example, a fault of the node device 101, the clusterware 107 executes system switching, which is switching between the active system and the standby system regarding the node devices, and the service unit included in another one of the node devices restarts the service.

The clusterware 107, which is denoted by reference numeral 203 in FIG. 2, includes a cluster controlling unit 205, a node managing unit 206, an operation status transmitting unit 207 and an operation status receiving unit 208 as shown in FIG. 2. The node managing unit 206 manages a node list A 209 for holding "identifiers," "addresses" and "operation statuses" of all of the nodes contained in the cluster system. The respective units 205 to 208 and the node list A 209 will be described in detail in explanation of the operation later.

Further, as shown in FIG. 1, the respective node devices 101 . . . are connected to a wired or wireless LAN (Local Area Network) (a first network). The respective node devices 101 . . . are enabled to perform communication with each other via the LAN and a network switch (1) 104 by the clusterware 107 operating on the operating system.

Furthermore, as shown in FIG. 1, the node devices 101 . . . include baseboard management controllers 108 . . . , respectively. Each of the baseboard management controllers 108 . . . operates as firmware implemented on hardware such as a processor installed in each of the node device 101 . . . , and operates independently of the aforementioned OS embedded in each of the node device 101 . . . . Therefore, even when any of the node devices 101 . . . comes to a standstill, a baseboard management controller 204 installed in each of the node devices 101 . . . can keep operating.

The baseboard management controllers 108 . . . installed in the node devices 101 . . . , respectively, are connected to a wired or wireless management LAN (a second network), and are capable of performing communication with each other via the management LAN and a network switch (2) 105. Because the network switch (1) 104 and the network switch (2) 105 are connected by a predetermined network, the clusterwares 107 . . . and the baseboard management controllers 108 . . . can also perform communication with each other.

In FIG. 2, the baseboard management controllers 108 . . . are denoted by reference numeral 204. The baseboard management controller 204 includes a BMC node managing unit 210, a BMC operation status acquiring unit 211, a BMC controlling unit 212 and a hardware monitoring unit 213 as shown in FIG. 2. Then, the BMC node managing unit 210 manages a node list B 214 for holding "identifiers" and "addresses" of all of the nodes contained in the cluster system. The respective units 210 to 213 and the node list B 214 will be described in detail in explanation of an operation later.

Next, the operation of the abovementioned node device 210 (each of the node devices 101 . . . ) will be described with reference to FIGS. 2 to 11.

Figure 4:
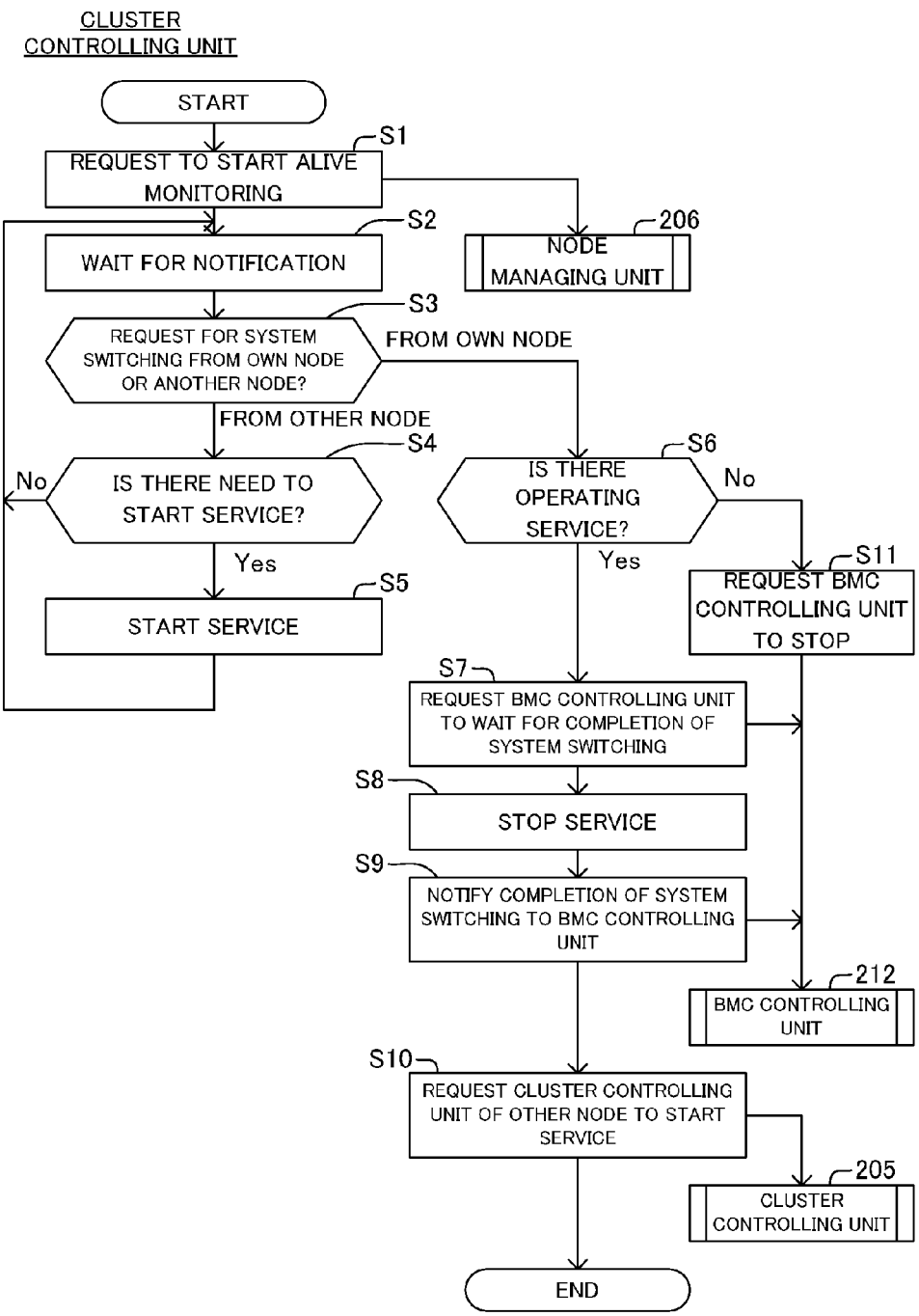
FIG. 4 is a flowchart showing the operation of a cluster controlling unit of the node disclosed in FIG. 2.

First, the cluster controlling unit 205 requests the node managing unit 206 to start alive monitoring of the node devices, that is, start detection of operation statuses representing whether the own node and the other nodes are normally operating or are down (are not normally operating) (step S1 in FIG. 4). The cluster controlling unit 205 waists for notification of the operation statuses from the respective node devices (step S2 in FIG. 4).

Figure 5:
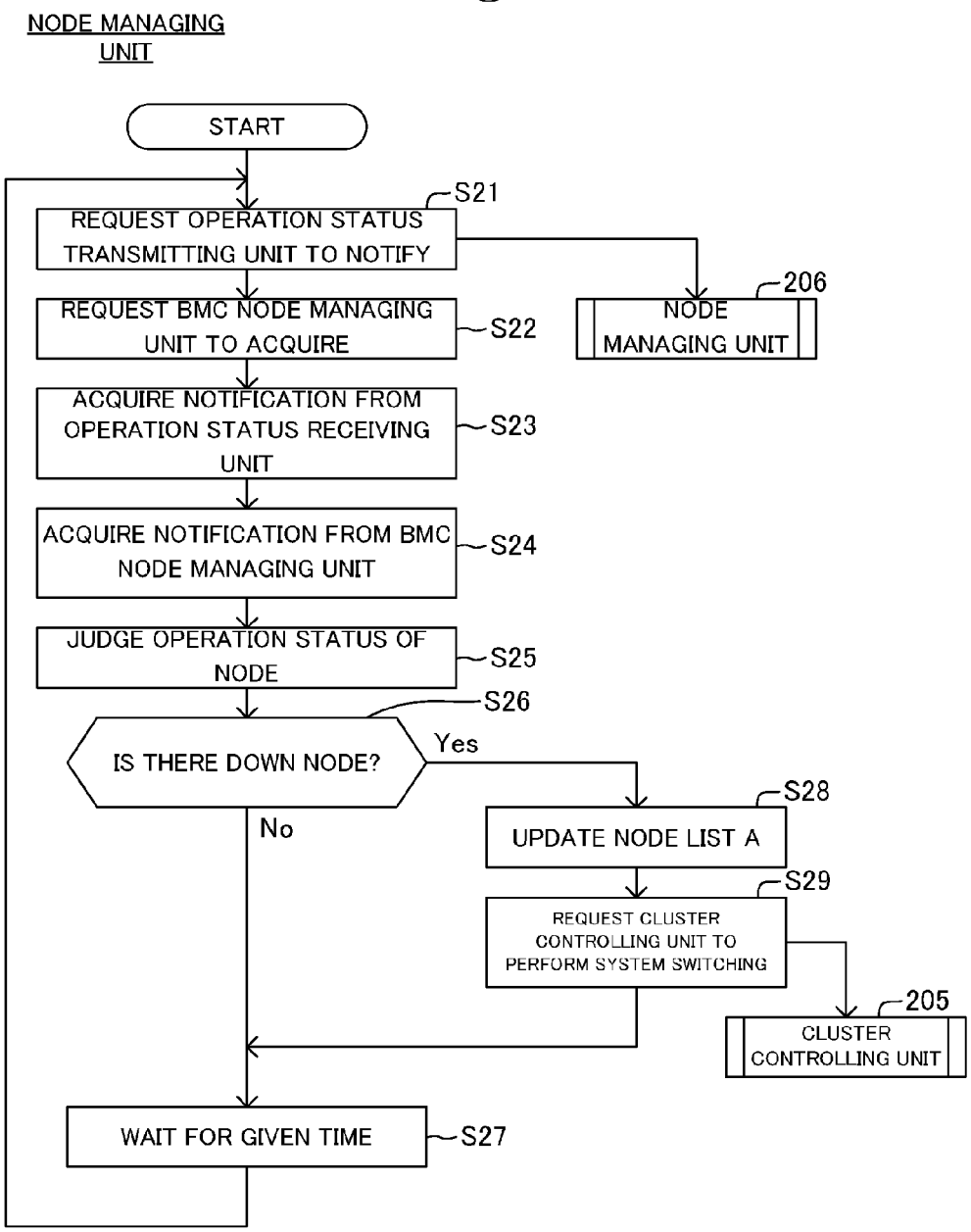
FIG. 5 is a flowchart showing the operation of a node managing unit of the node disclosed in FIG. 2.
Figure 6:
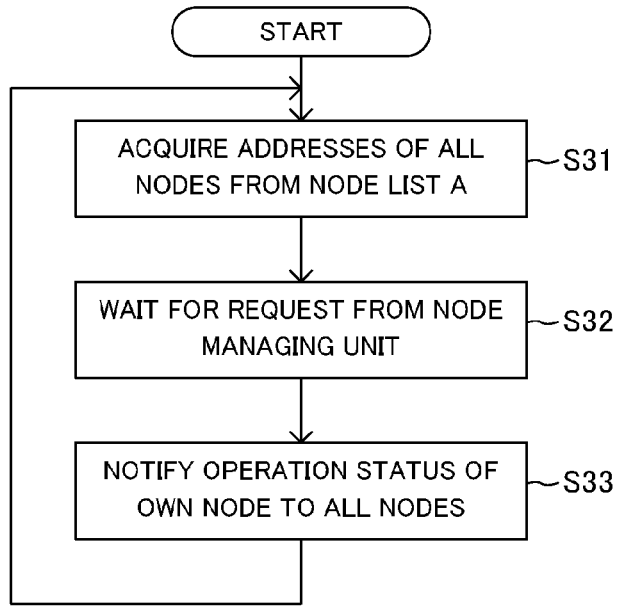
FIG. 6 is a flowchart showing the operation of an operation status transmitting unit of the node disclosed in FIG. 2.
Figure 7:
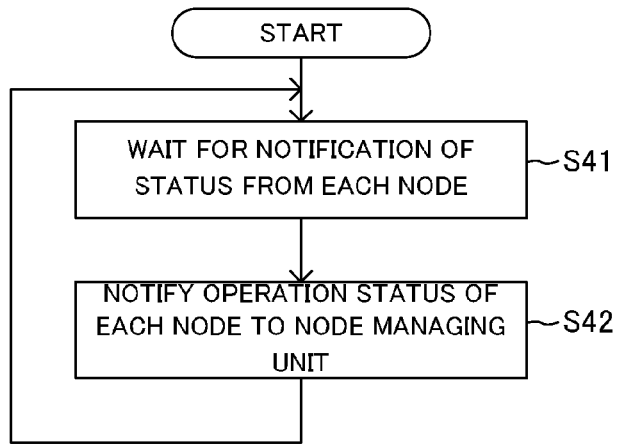
FIG. 7 is a flowchart showing the operation of an operation status receiving unit of the node disclosed in FIG. 2.
Figure 8:
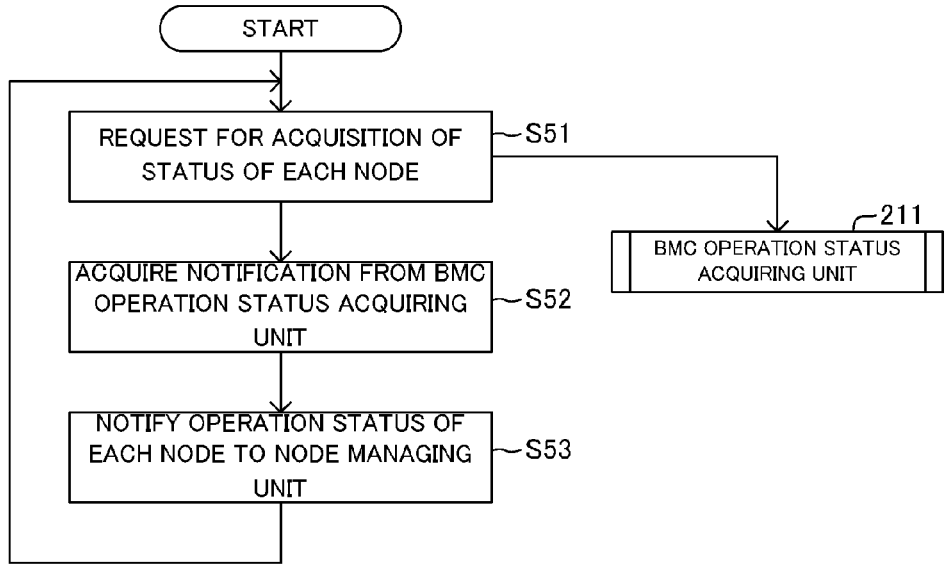
FIG. 8 is a flowchart showing the operation of a BMC node managing unit of the node disclosed in FIG. 2.

Upon reception of the request for alive monitoring of the operation statuses from the cluster controlling unit 205 as described above, the node managing unit 206 (a first node managing unit) requests the operation status transmitting unit 207 to notify the operation status "operating" of the own node (step S21 in FIG. 5). Then, based on the addresses of all of the nodes acquired from the node list A 209 via the node managing unit 206 (step S31 in FIG. 6), the operation status transmitting unit 207 notifies the operation status "operating" of the own node to all of the nodes (steps S32 and S33 in FIG. 6). The notification of the operation status by the operation status transmitting unit 207 is received by the operation status receiving unit 208 of each of the nodes, and the operation status receiving unit 208 notifies the notified operation status of each of the nodes to the node managing unit 206 every time receiving the notification (steps S41 and S42 in FIG. 7). The node managing unit 206 receives the operation status of each of the nodes from the operation status receiving unit 208 (step S23 in FIG. 5), and holds as the result of detection of the operation status of each of the nodes.

The node managing unit 206 judges a node device having not notified to the operation status receiving unit 208 for a given time or more to be in the down state, and holds the result of detection of the operation status of the node device. Because detection of the operation statuses of all of the nodes by the node managing unit 206 is executed on the OS, in such a case that the OS of any of the own node device or the other node devices is in a high-load condition, the node device cannot perform communication with the other nodes for a given time or more, and the node device is judged to be in the down state though the node device is not in the down state actually as mentioned above.

Further, the node managing unit 206 requests the BMC node managing unit 210 to acquire the operation statuses of all of the node devices almost in tandem with the process of detection of the operation statuses of all of the nodes executed on the OS described above (step S22 in FIG. 5). Thus, the BMC node managing unit 210 (a second node managing unit) requests the BMC operation status acquiring unit 211 to acquire the operation statuses of all of the nodes (step S51 in FIG. 8).

Figure 9:
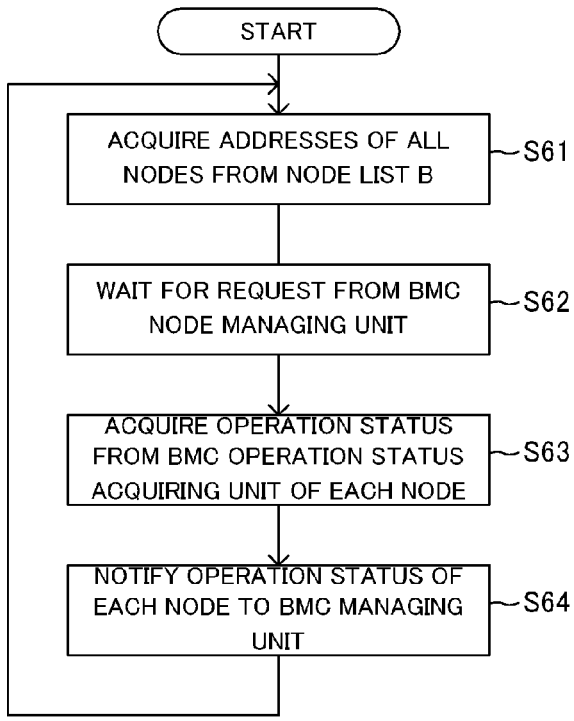
FIG. 9 is a flowchart showing the operation of a BMC operation status acquiring unit of the node disclosed in FIG. 2.

Based on the addresses of all of the nodes acquired from the node list B 214 via the BMC node managing unit 210 (step S61 in FIG. 9), the BMC operation status acquiring unit 211 acquires the operation status from the BMC operation status acquiring unit 211 of each of the nodes (steps S62 and S63 in FIG. 9). The acquired operation status result is notified to the BMC node managing unit 210 (step S64 in FIG. 9, step S52 in FIG. 8), and notified from the BMC node managing unit 210 to the node managing unit 206 (step S53 in FIG. 8).

Thus, by notification from the BMC node managing unit 210, the node managing unit 206 accepts and holds the result of detection of the operation statuses of all of the nodes without being affected by the OS, via the baseboard management controller 204 (step S24 in FIG. 5). Although the request to the BMC node managing unit 210 by the node managing unit 206 (step S22 in FIG. 5 described above) is periodically made, it is detected that the operation status of the own node in the BMC node managing unit 210 is a down state in a case that there is no request for a given time or more.

Subsequently, based on the result of detection of the operation statuses of all of the node devices executed on the OS received from the operation status receiving unit 208 as described above and the result of detection of the operation statuses of all of the node devices executed without affected by the OS received from the BMC node managing unit 210, the node managing unit 206 (a node status judging unit) judges the operation status of the node device (step S25 in FIG. 5). To be specific, the node managing unit 206 judges only a node device considered in the down state based on both the detection results to be in the down state that the node device is not normally operating actually.

Then, in a case that there is a node device judged to be in the down state ("Yes" at step S26 in FIG. 5), the node managing unit 206 updates the operation status of a corresponding node in the node list A 209 (step S28 in FIG. 5). In a case that the service unit 202 is operating in the node device judged to be in the down state, the node managing unit 206 requests the cluster controlling unit 205 to execute a system switching process (step S29 in FIG. 5). After that, upon reception of the system switching request (step S3 in FIG. 4), the cluster controlling unit 205 executes the system switching process, and the node managing unit 206 comes to standby for a given time (step S27 in FIG. 5).

Next, an operation of monitoring the hardware of a node device by the baseboard management controller 204 (a second node managing unit) will be described. The hardware monitoring unit 213 monitors the hardware of the own node (step S91 in FIG. 11) and, when detecting a fault, notifies to the BMC controlling unit 212 ("Yes" at step S92 and step S94 in FIG. 11, step S71 in FIG. 10). The BMC controlling unit 212 judges whether there is a need to stop the node depending on the severity of the fault, and takes the following measures.

Figure 10:
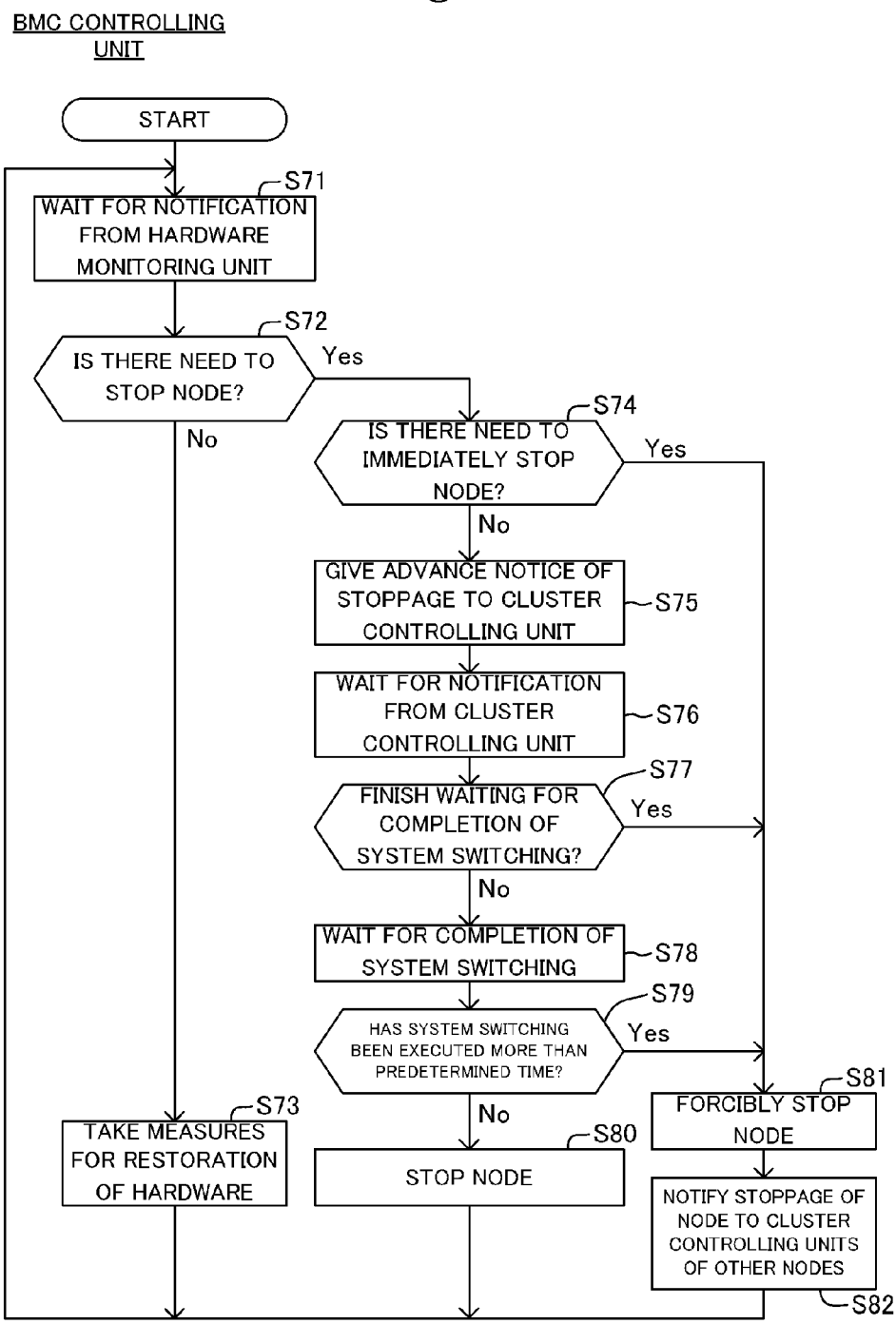
FIG. 10 is a flowchart showing the operation of a BMC controlling unit of the node disclosed in FIG. 2.

(1) When There is a Need to Immediately Stop the Node ("Yes" at Step S72 and "Yes" at Step S74 in FIG. 10)

Figure 11:
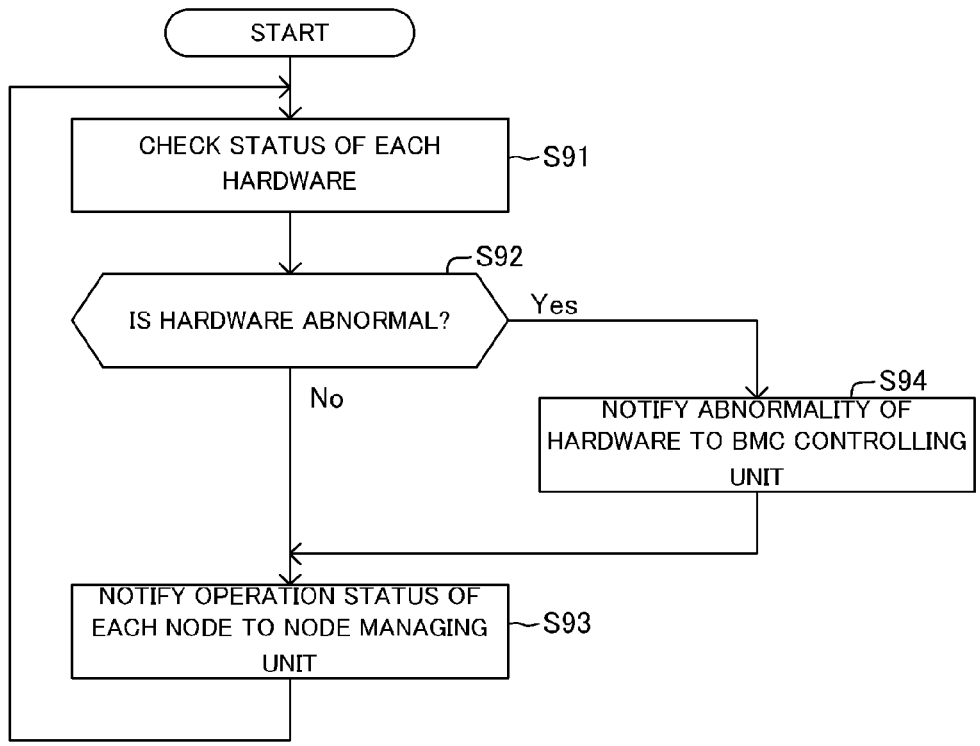
FIG. 11 is a flowchart showing the operation of a hardware monitoring unit of the node disclosed in FIG. 2.

The BMC controlling unit 212 forcibly stops the node (step S81 in FIG. 10), and notifies stoppage of the node to the cluster controlling unit 205 of the other node (step S82 in FIG. 10, step S93 in FIG. 11). In a case that the service unit 202 of the node 201 having been stopped has been operating, the cluster controlling unit 205 of the node 201 having received the notification executes system switching.

(2) When There is a Need to Stop the Node Within a Predetermined Time ("Yes" at Step S72 in FIG. 10 and "No" at Step S74 in FIG. 10)

Figure 3:
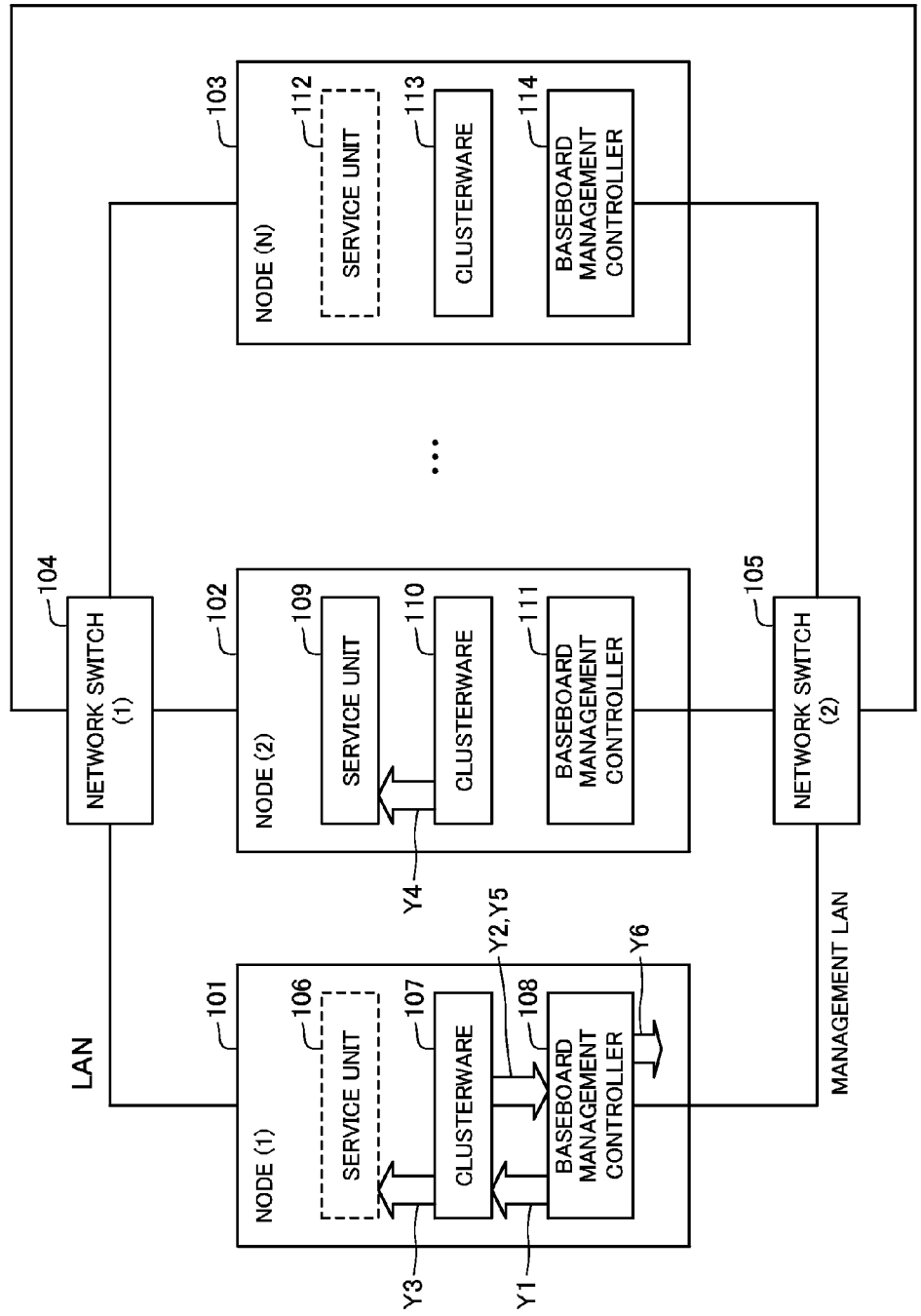
FIG. 3 is an explanation diagram for explaining the operation of the cluster system disclosed in FIG. 1.

The BMC controlling unit 212 gives an advance notice of stoppage to the cluster controlling unit 205 of the own node 201 (step S75 in FIG. 10, arrow Y1 in FIG. 3). In a case that the service unit 202 is not operating in the own node ("from own node" at step S3 and "No" at step S6 in FIG. 4), the cluster controlling unit 205 requests the BMC controlling unit 212 to stop the node (step 11 in FIG. 4, step S76 and "Yes" at step S77 in FIG. 10), and the BMC controlling unit 212 stops the node 201 (step S81 in FIG. 10).

Further, in a case that the service unit 202 is operating in the own node ("Yes" at step S6 in FIG. 4), the cluster controlling unit 205 requests the BMC controlling unit 212 to wait for completion of the system switching, in order to inhibit the stoppage process by the BMC controlling unit 212 ("No" at step S77 and step S78 in FIG. 10, step S7 in FIG. 4, arrow Y2 shown in FIG. 3). The cluster controlling unit 205 executes the system switching (step S8 in FIG. 4). For example, in the example shown in FIG. 3, the cluster controlling unit 205 stops the service unit 106 operating in the node (1) denoted by reference numeral 101, and executes the system switching so that the service unit 109 can move in the node (2) denoted by reference numeral 102 (arrow Y3 and Y4 in FIG. 3).

After completion of the system switching, in order to cancel the inhibition of the stoppage process by the BMC controlling unit 212, the cluster controlling unit 205 notifies the completion of the system switching to the BMC controlling unit 212 (step S9 in FIG. 4, arrow Y5 in FIG. 3). The BMC controlling unit 212 having received the notification stops the node 201 ("No" at step S79 and step S80 in FIG. 10, arrow Y6 in FIG. 3). However, in a case that the system switching is not completed within a predetermined time ("Yes" at step S79 in FIG. 10), the BMC controlling unit 212 forcibly stops the node 201 (step S81 in FIG. 10), and notifies the stoppage of the node 201 to the cluster controlling unit 205 of the other node 201 (step S82 in FIG. 10). The cluster controlling unit 205 of the other node 201 having received the notification executes system switching (step S10, "from other node" at step S3, step S4, and step S5 in FIG. 4).

(3) When There is No Need to Stop the Node ("No" at Step S72 in FIG. 10)

The BMC controlling unit 212 takes measures for restoration of hardware in which a fault is caused (step S73 in FIG. 10).

Thus, in the cluster system according to the present invention, alive monitoring of nodes by the baseboard management controller 108 is not affected by the operation status of the OS, so that it is possible, even when a node comes into a state incapable of performing communication with another node due to the operation status of the OS, to accurately grasp the operation status of the node. Therefore, it is possible to avoid judging that a node device is in the down state, and it is possible to increase the reliability of the cluster system.

Further, the cluster system according to the present invention detects a hardware fault in hardware monitoring by the baseboard management controller 108 that is not affected by the operation status of the OS and immediately notifies to all nodes, and hence, can immediately execute system switching in a case that a node goes down due to a hardware fault. As a result, it is possible to increase the reliability of the cluster system.

Second Exemplary Embodiment

Figure 12:
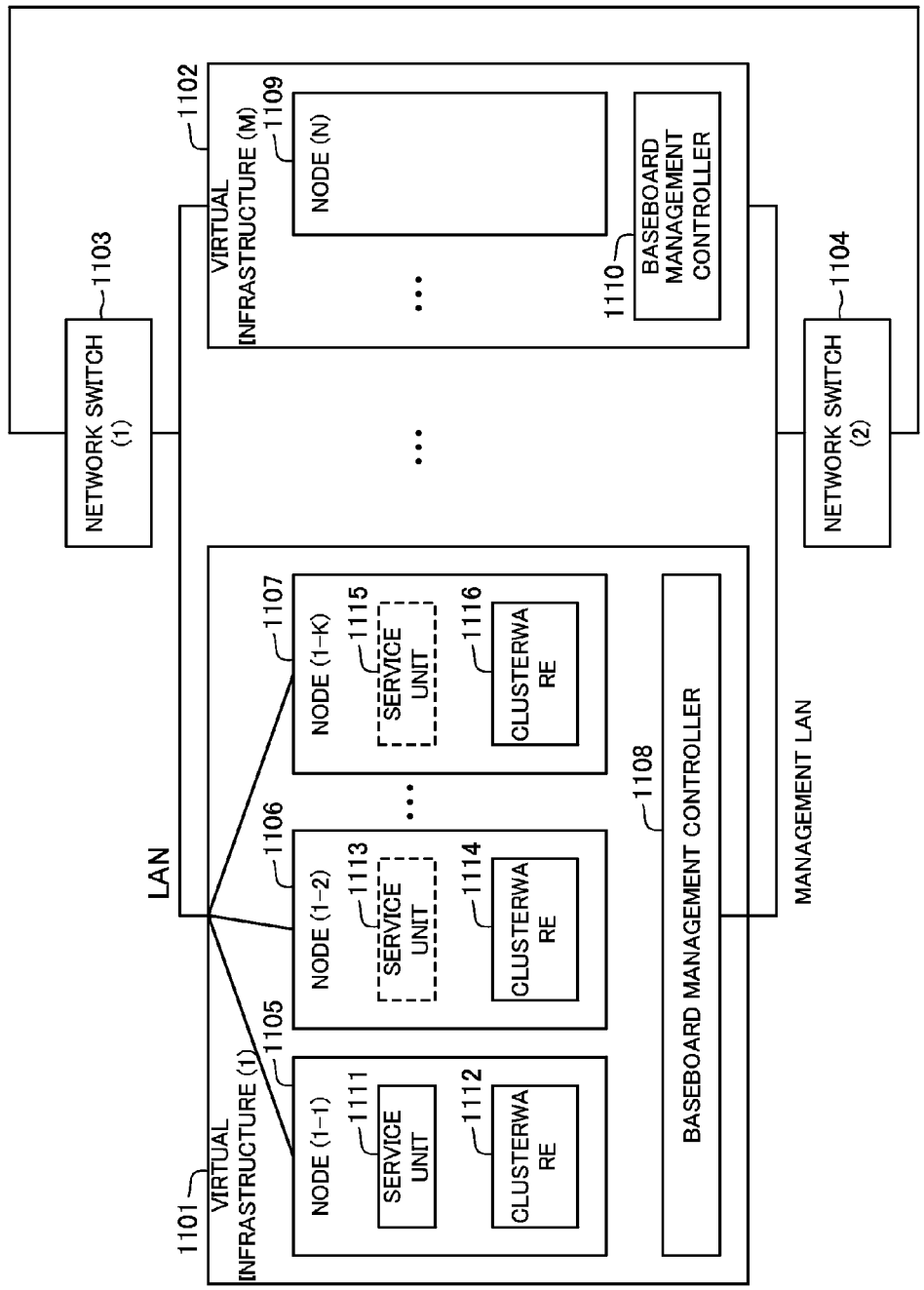
FIG. 12 is a block diagram showing the configuration of a cluster system in a second exemplary embodiment of the present invention
Figure 13:
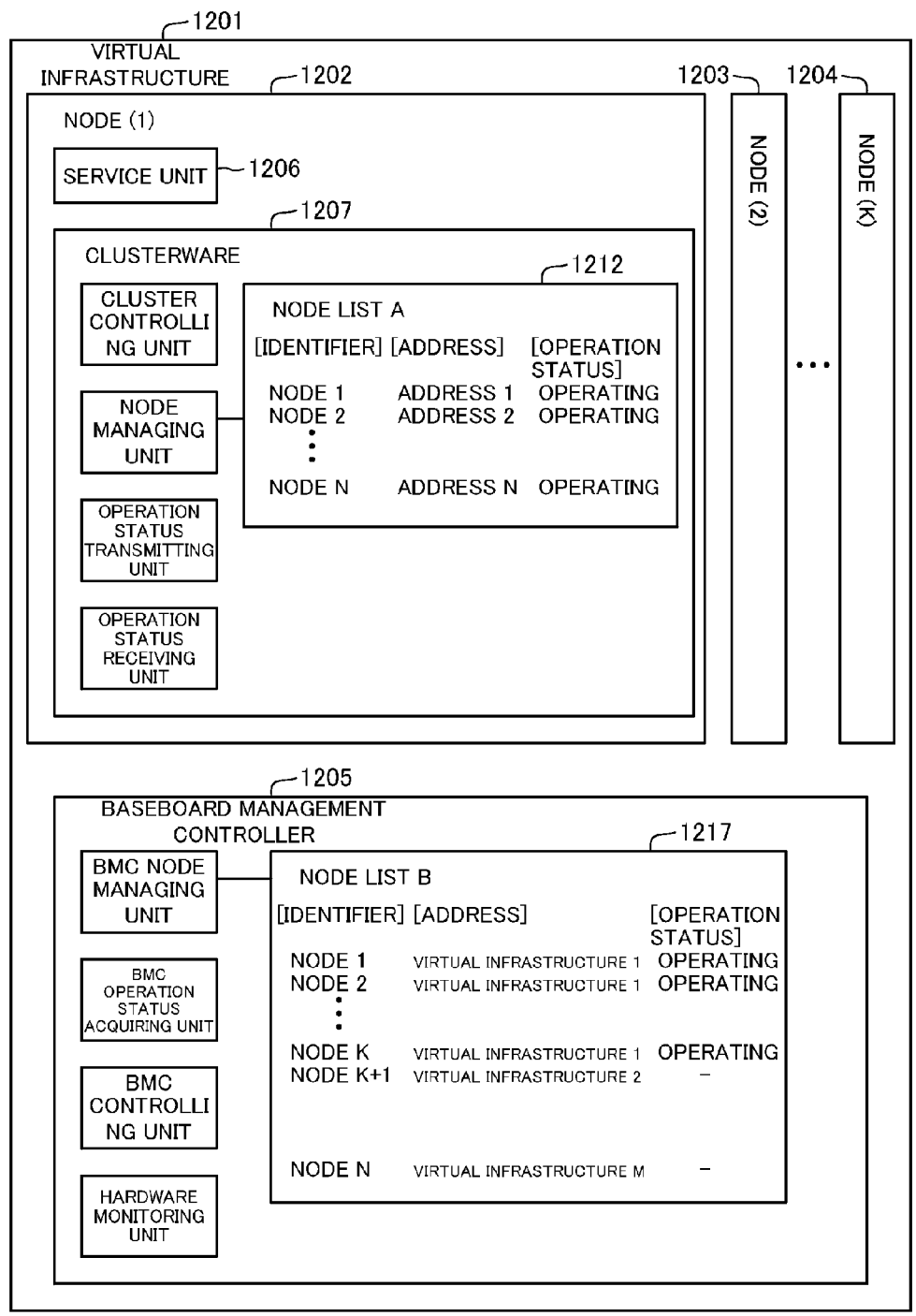
FIG. 13 is a block diagram showing the configuration of a virtual infrastructure configuring the cluster system disclosed in FIG. 12.

Next, a second exemplary embodiment of the present invention will be described with reference to FIGS. 12 and 13. As shown in FIGS. 12 and 13, it is possible to realize the cluster system according to the present invention in a virtual environment.

In a virtual environment, as shown in FIG. 12, a plurality of nodes 1105 . . . operate within a virtual infrastructure (1) 1101, but it is enough to install only one baseboard management controller 1108. Each of K nodes within a virtual infrastructure 1201 shown in FIG. 13 acquires the operation statuses of the other nodes via the same baseboard management controller 1205 without being affected by the OS.

A node list A 1212 managed by a node managing unit 1209 has the same configuration as the node list described in the first exemplary embodiment, whereas a node list B 1217 managed by a BMC node managing unit 1213 holds the "addresses" of virtual infrastructures and the "operation statuses of nodes within each of virtual infrastructures." Thus, it is possible to acquire the operations statuses of a plurality of nodes in bulk from one virtual infrastructure.

[Supplementary Notes]

Figure 14:
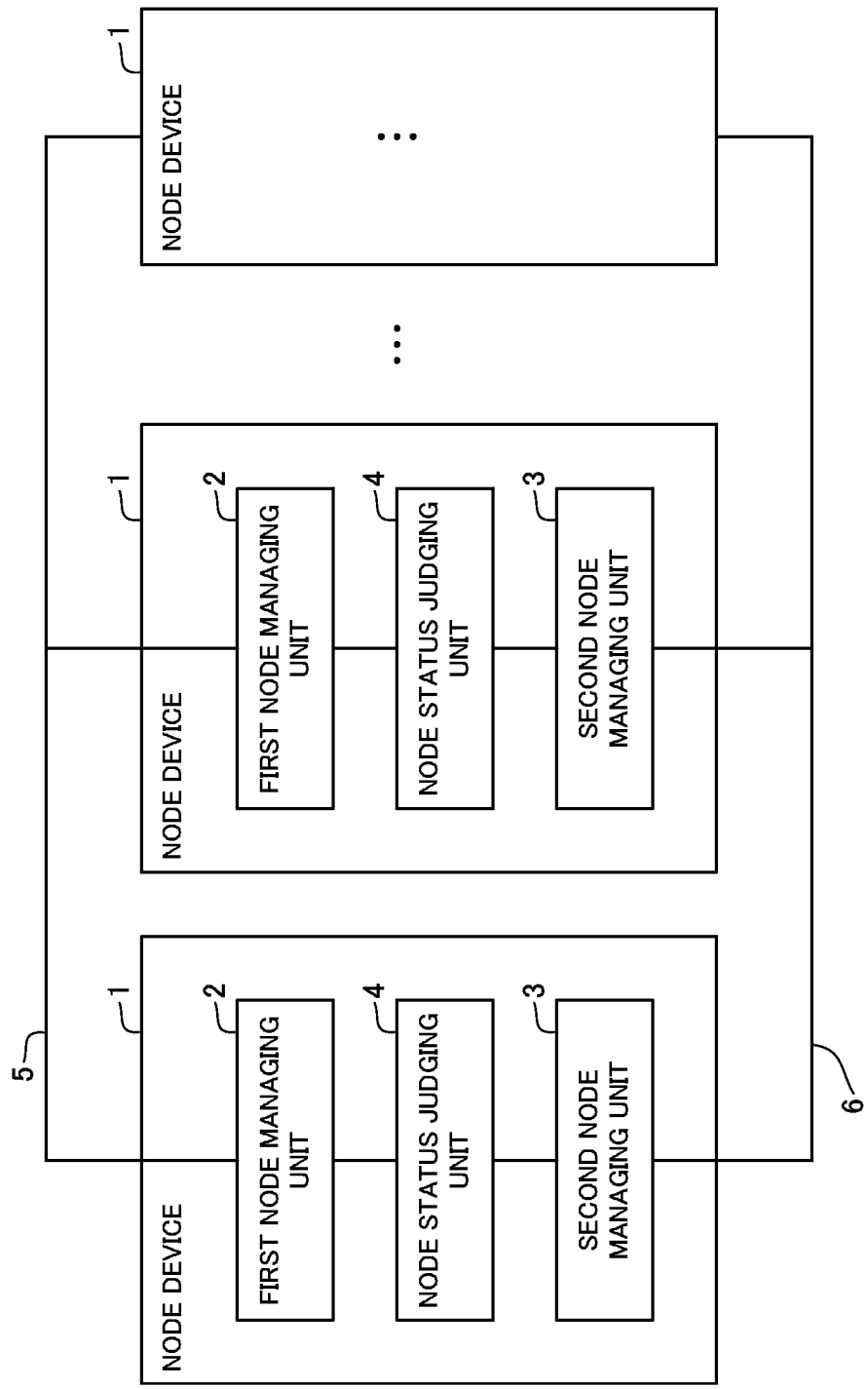
FIG. 14 is a block diagram showing the configuration of a cluster system in Supplementary Note 1 of the present invention.

The whole or part of the exemplary embodiments disclosed above can be described as the following supplementary notes. Below, the outline of configurations of a cluster system (refer to FIG. 14), a program and a node management method according to the present invention will be described. However, the present invention is not limited to the following configurations.

(Supplementary Note 1)

A cluster system comprising a plurality of node devices, wherein each of the node devices 1 is connected with the other node devices by a first network 5 and a second network 6, and includes:

a first node managing unit 2 configured to operate on an operating system embedded in an own device and detect operation statuses of the other node devices via the first network 5;

a second node managing unit 3 configured to operate without being affected by the operating system and detect operation statuses of the other node devices via the second network 6; and a node status judging unit 4 configured to judge whether each of the node devices is in a down state according to a preset standard, based on results of the detection of the other node devices by the first node managing unit 2 and the second node managing unit 3.

(Supplementary Note 2)

The cluster system according to Supplementary Note 1, wherein the node status judging unit is configured to, in a case that both the first node managing unit and the second node managing unit detect that any of the node devices is in the down state according to the preset standard, judge the node device to be in the down state.

(Supplementary Note 3)

The cluster system according to Supplementary Note 2, comprising a cluster controlling unit configured to, in a case that the node device judged to be in the down state by the node status judging unit is executing a preset process, execute a node switching process of switching so that another of the node devices executes the preset process.

(Supplementary Note 4)

The cluster system according to Supplementary Note 3, wherein the second node managing unit is configured to operate without being affected by the operating system and monitor an operation status of hardware installed in the own device and, depending on a result of the monitoring, stop operation of the own device.

(Supplementary Note 5)

The cluster system according to Supplementary Note 4, wherein:

the second node managing unit is configured to notify, to the cluster controlling unit, that the operation of the own device is due to be stopped based on the result of the monitoring;

the cluster controlling unit is configured to receive notification that the operation of the own device is due to be stopped from the second node managing unit and, in a case that the own device is executing a preset process, execute the node switching process of switching so that another of the other node devices executes the process, and notify completion of the node switching process to the second node managing unit after the completion of the node switching process; and the second node managing unit is configured to stop the operation of the own device after receiving notification that the node switching process by the cluster controlling unit is completed.

(Supplementary Note 6)

A program for causing each of a plurality of node devices configuring a cluster system including the plurality of node devices, to realize:

a first node managing unit configured to operate on an operating system embedded in an own device and detect operation statuses of the other node devices via a first network connected to the other node devices;

a second node managing unit configured to operate without being affected by the operating system and detect operation statuses of the other node devices via a second network connected to the other node device; and a node status judging unit configured to judge whether each of the node devices is in a down state according to a preset standard, based on results of the detection of the other node devices by the first node managing unit and the second node managing unit.

(Supplementary Note 7)

The program according to Supplementary Note 6, wherein the node status judging unit is configured to, in a case that both the first node managing unit and the second node managing unit detect that any of the node devices is in the down state according to the preset standard, judge the node device to be in the down state.

(Supplementary Note 8)

A node management method comprising, in a cluster system including a plurality of node devices:

by a first node managing unit configured to operate on an operating system embedded in each of the node devices, detecting operation statuses of the other node devices via a first network connected with the other node devices;

by a second node managing unit configured to operate without being affected by the operating system embedded in the node device, detecting operation statuses of the other node devices via a second network connected with the other node device; and judging whether each of the node devices is in a down state according to a preset standard, based on results of the detection of the other node devices by the first node managing unit and the second node managing unit.

(Supplementary Note 9)

The node management method according to Supplementary Note 8, comprising:

in a case that both the first node managing unit and the second node managing unit detect that any of the node devices is in the down state according to the preset standard, judging the node device to be in the down state.

The program disclosed above is stored in a storage device, or recorded on a non-transitory computer-readable recording medium. For example, the non-transitory computer-readable recording medium is a portable medium such as a flexible disk, an optical disk, a magneto-optical disk and a semiconductor memory.

Although the present invention has been described above with reference to the aforementioned exemplary embodiments, the present invention is not limited to the exemplary embodiments. The configurations and details of the present invention can be altered in various manners that can be understood by those skilled in the art within the scope of the present invention.

The invention claimed is:

1. A cluster system comprising a plurality of node devices, wherein each of the node devices is connected with the other node devices by a first network and a second network, and includes:

a first node managing unit configured to operate on an operating system embedded in an own device and detect operation statuses of the other node devices via the first network;

a second node managing unit mounted on the own device configured to operate without being affected by the operating system installed in the own device and detect operation statuses of the other node devices via the second network; and a node status judging unit configured to, based on results of the detection of one of the other node devices by the first node managing unit and the second node managing unit, judge whether the one of the node devices is in a down state according to a preset standard.

2. The cluster system according to claim 1, wherein the node status judging unit is configured to, in a case that both the first node managing unit and the second node managing unit detect that any of the node devices is in the down state according to the preset standard, judge the node device to be in the down state.

3. The cluster system according to claim 2, comprising a cluster controlling unit configured to, in a case that the node device judged to be in the down state by the node status judging unit is executing a preset process, execute a node switching process of switching so that another of the node devices executes the preset process.

4. The cluster system according to claim 3, wherein the second node managing unit is configured to operate without being affected by the operating system and monitor an operation status of hardware installed in the own device and, depending on a result of the monitoring, stop operation of the own device.

5. The cluster system according to claim 4, wherein:

the second node managing unit is configured to notify, to the cluster controlling unit, that the operation of the own device is due to be stopped based on the result of the monitoring;

the cluster controlling unit is configured to receive notification that the operation of the own device is due to be stopped from the second node managing unit and, in a case that the own device is executing a preset process, execute the node switching process of switching so that another of the other node devices executes the process, and notify completion of the node switching process to the second node managing unit after the completion of the node switching process; and the second node managing unit is configured to stop the operation of the own device after receiving notification that the node switching process by the cluster controlling unit is completed.

6. A non-transitory computer-readable storage medium storing a program for causing each of a plurality of node devices configuring a cluster system including the plurality of node devices, to realize:

a first node managing unit configured to operate on an operating system embedded in an own device and detect operation statuses of the other node devices via a first network connected to the other node devices;

a second node managing unit mounted on the own device configured to operate without being affected by the operating system installed in the own device and detect operation statuses of the other node devices via a second network connected to the other node device; and a node status judging unit configured to, based on results of the detection of one of the other node devices by the first node managing unit and the second node managing unit, judge whether the one of the node devices is in a down state according to a preset standard.

7. The non-transitory computer-readable storage medium storing the program according to claim 6, wherein the node status judging unit is configured to, in a case that both the first node managing unit and the second node managing unit detect that any of the node devices is in the down state according to the preset standard, judge the node device to be in the down state.

8. A node management method comprising, in a cluster system including a plurality of node devices:

by a first node managing unit configured to operate on an operating system embedded in an own devices, detecting operation statuses of the other node devices via a first network connected with the other node devices;

by a second node managing unit mounted on the own device configured to operate without being affected by the operating system installed in the own device embedded in the node device, detecting operation statuses of the other node devices via a second network connected with the other node device; and judging, based on results of the detection of a one of the other node devices by the first node managing unit and the second node managing unit, whether the one of the node devices is in a down state according to a preset standard.

9. The node management method according to claim 8, comprising:

in a case that both the first node managing unit and the second node managing unit detect that any of the node devices is in the down state according to the preset standard, judging the node device to be in the down state.

* * * * *